(12) United States Patent
McLain et al.

(10) Patent No.: US 7,305,298 B2
(45) Date of Patent: Dec. 4, 2007

(54) CHARGE MOTION CONTROL VALVE FUZZY LOGIC DIAGNOSTIC

(75) Inventors: Kurt D. McLain, Clarkston, MI (US); Wenbo Wang, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 58 days.

(21) Appl. No.: 11/402,733

(22) Filed: Apr. 12, 2006

(65) Prior Publication Data

US 2007/0244626 A1 Oct. 18, 2007

(51) Int. Cl.
*F02D 13/00* (2006.01)
*B60T 7/12* (2006.01)
(52) U.S. Cl. ...................... 701/106; 123/347
(58) Field of Classification Search ................ 701/101, 701/103, 106, 107, 114, 115; 123/90.15, 123/347, 348, 321, 322; 73/118.2
See application file for complete search history.

(56) References Cited

U.S. PATENT DOCUMENTS

| | | | |
|---|---|---|---|
| 5,720,258 A * | 2/1998 | Tolkacz et al. | 123/352 |
| 6,968,826 B2 * | 11/2005 | Doering | 123/406.2 |
| 7,051,705 B2 * | 5/2006 | Doering | 123/350 |
| 2004/0089267 A1 * | 5/2004 | Doering | 123/406.23 |
| 2004/0204813 A1 * | 10/2004 | Doering | 701/110 |
| 2006/0212209 A1 * | 9/2006 | Cesario et al. | 701/106 |

\* cited by examiner

*Primary Examiner*—John T. Kwon

(57) ABSTRACT

A method of diagnosing a malfunction of a charge motion control valve coupled to an intake manifold of an internal combustion engine is provided. The method includes: commanding the valve to at least one of close and open; determining a pressure range using fuzzy logic based on a mass of air flowing into the intake manifold and a temperature of the air flowing into the intake manifold; determining a change in absolute pressure of the intake manifold; comparing the change in absolute pressure to the pressure range; and diagnosing a malfunction of the valve when the change in absolute pressure is within the pressure range.

18 Claims, 4 Drawing Sheets

CHARGE MOTION CONTROL VALVE FUZZY LOGIC DIAGNOSTIC

FIELD

The present disclosure relates to internal combustion engines, and more particularly to managing airflow in an intake manifold of an internal combustion engine.

BACKGROUND

The statements in this section merely provide background information related to the present disclosure and may not constitute prior art.

Engine systems include an engine having an air intake manifold. Air flows into the intake manifold through an inlet. An air filter removes dirt or debris from the inlet air. A throttle valve regulates the air flow into the intake manifold. A controller determines an appropriate air/fuel (A/F) ratio for engine operation based on the air flow and other engine parameters. Internal combustion engines having one or more cylinders may be provided with at least one control valve for controlling the state of charge within the cylinder. The valve is located at or near the intake of the cylinder. The valve opens and closes to control the motion and velocity of the air entering the cylinder.

Typically a position sensor is mounted to the valve to indicate to the controller an actual position of the valve. The actual position is used by control systems to diagnose a malfunction of the valve. For example, the actual position and a commanded position may be compared to detect the malfunction. However, an indication of the position of the valve may not be sufficient to indicate the true status of the valve. Additional methods should be employed to ensure the valve is functioning during vehicle operation according to design requirements.

SUMMARY

Accordingly, a method of diagnosing a malfunction of a charge motion control valve coupled to an intake manifold of an internal combustion engine is provided. The method includes: commanding the valve to at least one of close and open; determining a pressure range using fuzzy logic based on a mass of air flowing into the intake manifold and a temperature of the air flowing into the intake manifold; determining a change in absolute pressure of the intake manifold; comparing the change in absolute pressure to the pressure range; and diagnosing a malfunction of the valve when the change in absolute pressure is within the pressure range.

In other features, a control system for determining a malfunction of a charge motion control valve coupled to an intake manifold of an engine is provided. The control system includes: a first input device that receives a manifold absolute pressure (MAP) signal indicating an absolute pressure of air in the intake manifold; a second input device that receives a mass airflow (MAF) signal indicating a mass of air flowing into the intake manifold; a third input device that receives an intake air temperature (IAT) signal indicating a temperature of the air entering the intake manifold; and a control module that determines a malfunction of a charge motion control valve by commanding the control valve from at least one of close to open and open to close and evaluating the MAP signal after the control valve is commanded to the at least one of close and open, wherein the control module evaluates the MAP signal by computing a change in MAP, determining a range using fuzzy logic based on the MAF signal and the IAT signal, and comparing the change in MAP to the determined range.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
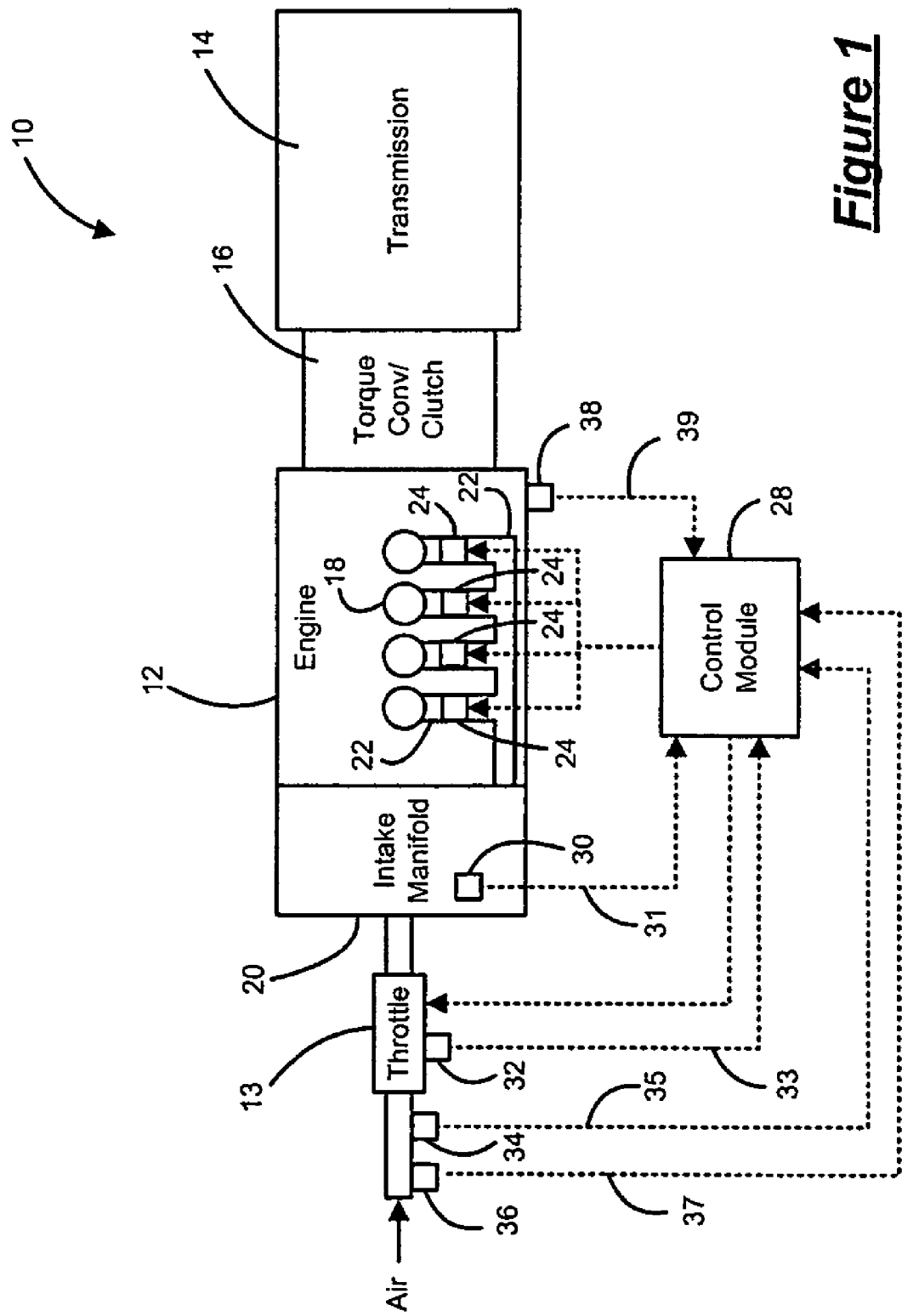
FIG. 1 is a functional block diagram of a vehicle.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. Although FIG. 1 depicts four cylinders (N=4), it is appreciated that the engine 12 may include additional or fewer cylinders 18. For example, engines having 4, 5, 6, 8, 10, 12 and 16 cylinders are contemplated. Air flows into the engine 12 through an intake manifold 20, is directed to the cylinders 18 through runners 22 of the intake manifold 20, and is combusted with fuel in the cylinders 18.

Figure 2:
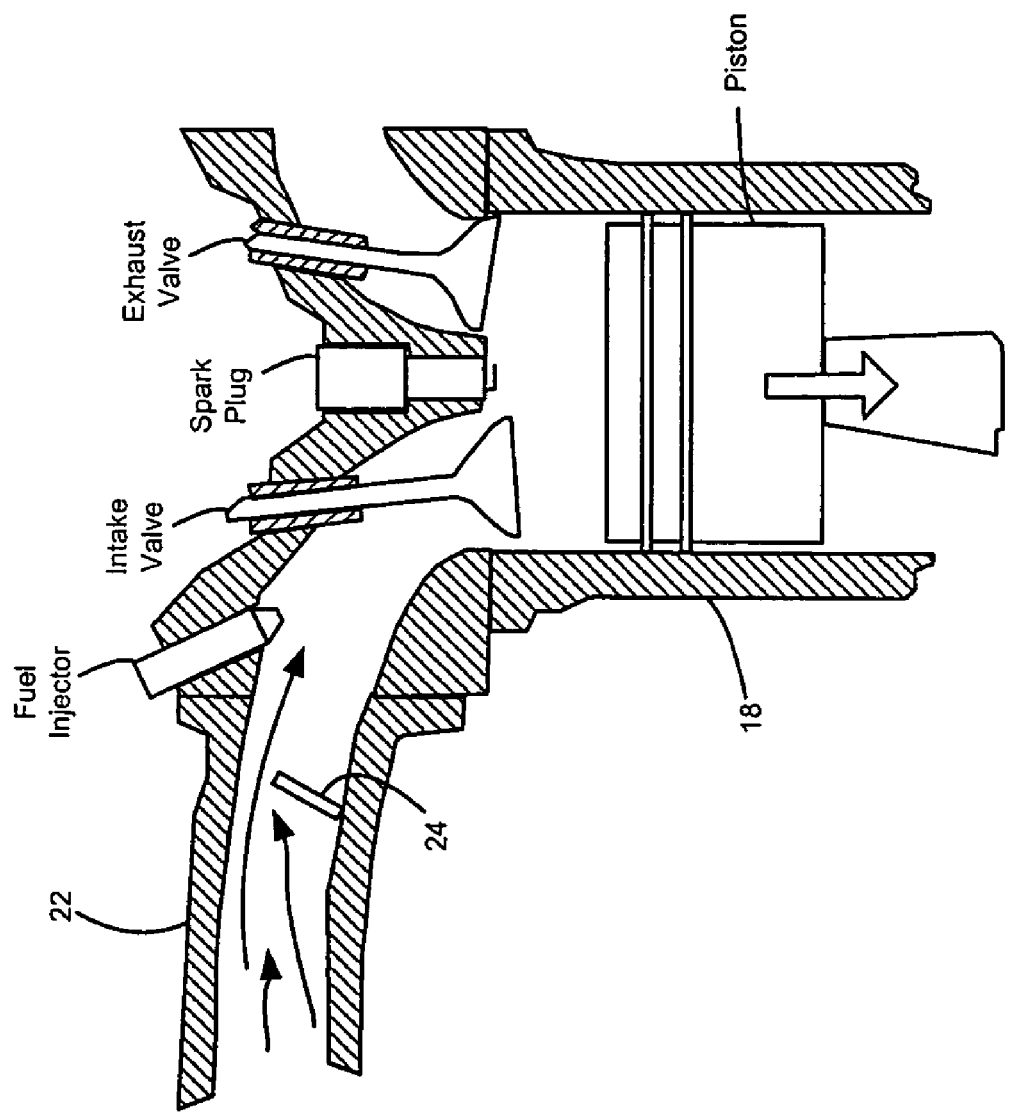
FIG. 2 is a functional block diagram of an engine cylinder including a charge motion control valve (CMCV).

Referring now to FIGS. 1 and 2, the engine further includes one or more charge motion control valves (CMCV) 24 that may produce a synchronous step change in MAP. The CMCVs 24 are located within respective intake runners 22 associated with respective cylinders 18. Although four CMCVs 24 are illustrated in FIG. 1, it is appreciated that fewer or more CMCVs 24 can be implemented.

The CMCV 24 of FIG. 2 partially inhibits airflow from the intake manifold into the cylinder 18. At low speeds and lighter loads, the electronically controlled CMCV 24 close, leaving only a small opening. Air jets through this gap, creating a tumble effect in the combustion cylinder and forcing fuel to mix more thoroughly and burn quickly and evenly. The CMCV opens to predetermined points as the engine revs up. At higher speeds, the valves do not affect the intake, letting maximum flow into the combustion chamber at wide-open throttle. In various embodiments, the CMCV can be a baffle-like valve that operates at a partial throttle opening to induce tumble in the intake fuel/air charge. The better mix of fuel and air improves flame propagation even during high exhaust-gas-recirculation levels. At wider throttle positions the valve opens completely so as to not impede airflow.

In FIG. 1, a controller 28 communicates with the engine 12 and various inputs and sensors as discussed herein. A manifold absolute pressure (MAP) sensor 30 is responsive to air pressure within the intake manifold 20 and generates a MAP signal 31. A throttle position sensor 32 is responsive to position of the throttle 13 and generates a throttle position (TPS) signal 33. A mass airflow (MAF) sensor 34 is responsive to a mass of air flowing into the intake manifold 20 and generates a MAF signal 35. An intake air temperature sensor (IAT) 36 is responsive to a temperature of air flowing into the intake manifold 20 and generates an IAT signal 37. An engine speed sensor 38 is responsive to a rotational speed of the engine 12 and generates an engine speed (RPM) signal 39. The controller 28 is receptive of the TPS signal 33, the MAP signal 31, the IAT signal 37, the MAF signal 35, and the RPM signal 39. The controller 28 controls operation of the engine and the CMCVs 24 based on the CMCV control method of the present disclosure.

In order to check the CMCV performance, a control strategy utilizing fuzzy logic is implemented. The control strategy according to the present disclosure moves the CMCV 24 to a closed position while the vehicle is in a steady state cruise condition and verifies that the valve has actually moved to the commanded closed position by evaluating engine operating parameters. Alternatively, the control strategy moves the CMCV 24 to the open position and verifies that the valve has actually moved to the commanded open position. The change in CMCV position will produce a change in MAP that is proportional to the actual position change or effective cross-area ($A_{eff}$) of the CMCV 24. The relationship can be represented by the following equation:

$$A_{eff} = \dot{M} * \left[ \frac{(R*T)^{1/2}}{Phi * MAP} \right]. \tag{1}$$

Where $\dot{M}$ is measured airflow that can be received from the MAF sensor 34. R is the ideal gas constant for air. In an exemplary embodiment R is equal to 288.17 N–M/(Kg*K). T is the upstream air temperature that can be received from the IAT sensor 36. Phi is equal to 0.6847 for sonic flow and Phi is equal to the following relation for sub-sonic flow:

$$Phi = \left[ \frac{2k}{k-1} (P_r^{(2/k)} - P_r^{((k+1)/k)}) \right]^{1/2}. \tag{2}$$

Where k is the ratio of specific heat for air. In an exemplary embodiment k is equal to 1.4. $P_r$ is the pressure ratio across the CMCV and is equal to the pressure after the CMCV divided by MAP.

When the pressure after the CMCV 24 is available, the effective cross-area can be simply calculated and compared to selectable thresholds to determine open and closed positions of the CMCV 24. When the pressure after the CMCV 24 is not available, equation 1 is simplified to the following equation on the assumption that Phi is primarily a function of MAP under certain engine operating conditions:

$$A_{eff} = \dot{M} * \left[ \frac{(R*T)^{1/2}}{f(MAP)} \right]. \tag{3}$$

In this case, the change in MAP, when the CMCV is controlled from open to close or close to open, is monitored. A fuzzy logic table is applied to provide thresholds for comparison. The fuzzy logic table is a function of measured mass air flow and intake air temperature. If the change in MAP is within the provided thresholds, a malfunction of the CMCV is diagnosed.

Figure 3:
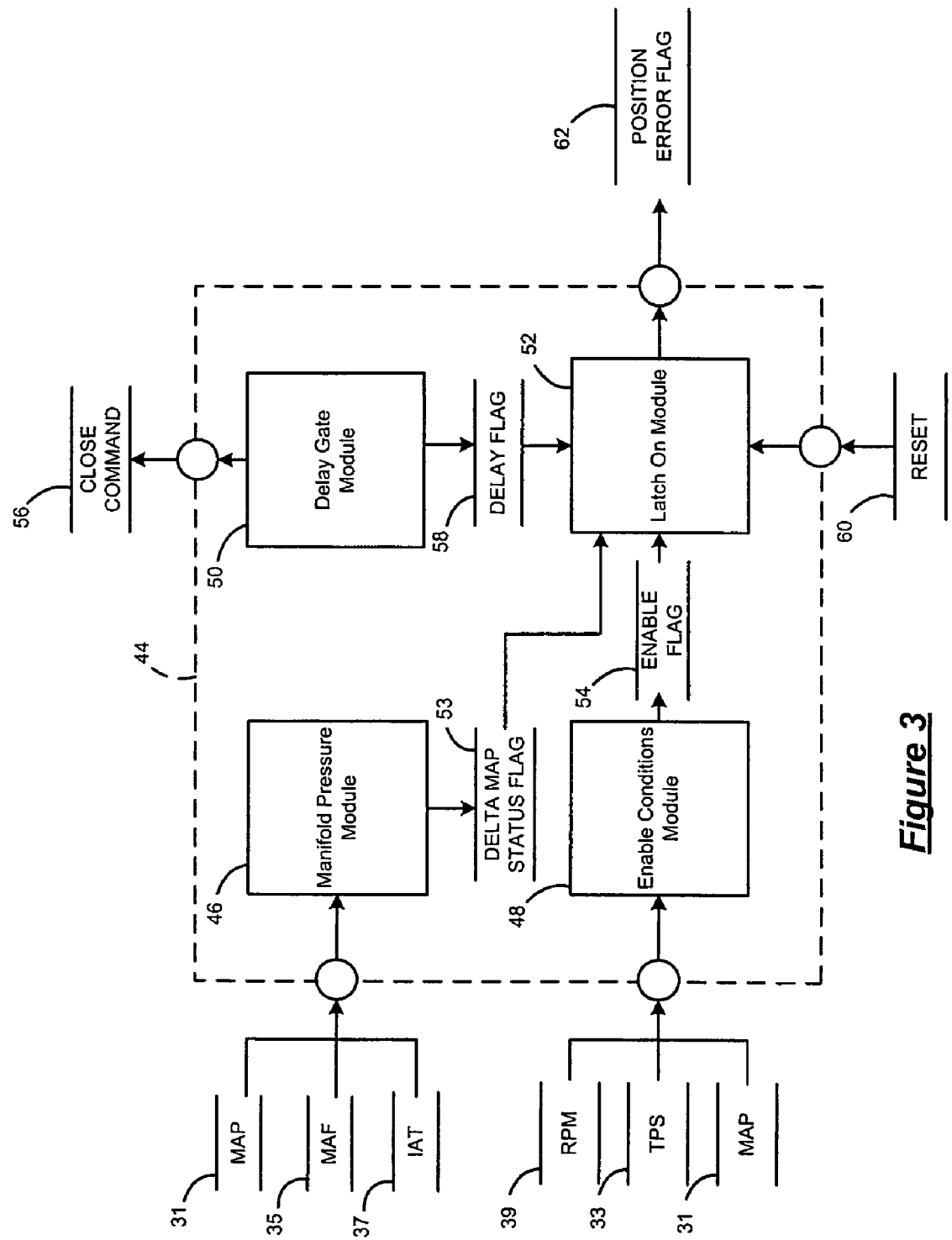
FIG. 3 is a dataflow diagram illustrating a CMCV control system.

Referring now to FIG. 3, a dataflow diagram illustrates various embodiments of a CMCV control system that may be embedded within the controller 28. Various embodiments of CMCV control systems according to the present disclosure may include any number of sub-modules embedded within the controller 28. The sub-modules shown may be combined and/or further partitioned to similarly determine a position of the CMCV 24 and diagnose failures. In various embodiments, the controller 28 of FIG. 2 includes a manifold pressure module 46, an enable conditions module 48, a delay gate module 50, and a latch on module 52.

The manifold pressure module 46 receives as input the MAP signal 31, the MAF signal 35, and the IAT signal 37. The manifold pressure module 46 determines a change in manifold pressure, compares the change to a determined range, and sets a delta MAP status flag 53 based on the comparison. The range includes a low and a high threshold determined as a function of mass airflow and air temperature according to fuzzy logic. In various embodiments the thresholds of the range are determined from a predefined two dimensional look-up table with MAF 35 and IAT 37 as the input and a delta MAP as output.

The enable conditions module 48 receives as input the TPS signal 33, the MAP signal 31, and the RPM signal 39. The enable conditions module 48 determines whether the vehicle is operating under steady state conditions based on the throttle position 33. The enable conditions module 48 also determines whether engine speed and manifold absolute pressure are sufficient and sets an enable flag 54 accordingly. The delay gate module 50 receives as input a close command 56 indicating whether the CMCV 24 is commanded closed. The delay gate module 50 determines whether the CMCV 24 has been commanded closed for a selectable period of time and sets a delay flag 58 accordingly.

The latch on module 52 receives as input the delta MAP status flag 53, the enable flag 54, and the delay flag 58. The latch on module 52 detects a malfunction in the CMCV 24 and sets a position error flag 62 accordingly. The position error flag is set based on: the delta MAP status flag 53 indicating a change in MAP that is within the determined range, the enable flag 54 indicating that the engine 12 is operating under steady state cruise conditions, and the delay flag 58 indicating that the CMCV 24 has been commanded to the closed position for a selectable period of time.

The latch on module 52 may also receive as input a reset flag 60. The latch on module 52 may latch the position error flag 62 once set until the reset flag 60 is received. In various embodiments, the reset flag 60 may be received upon start-up of the vehicle, during a diagnostic clear code event, and/or other similar events. In various embodiments the position error flag 62 may be reset based on a pass/fail threshold. If the position error flag indicates no malfunction (also referred to as test pass) a certain number of times after the malfunction (also referred to as test fail), the position error flag 62 is reset. In various embodiments, the position error flag 62 may be set based on another pass/fail threshold. For example, if a malfunction has been detected a consecutive number of times or a selectable number of times within a time period, then the position error flag 62 is set to indicate a malfunction.

Figure 4:
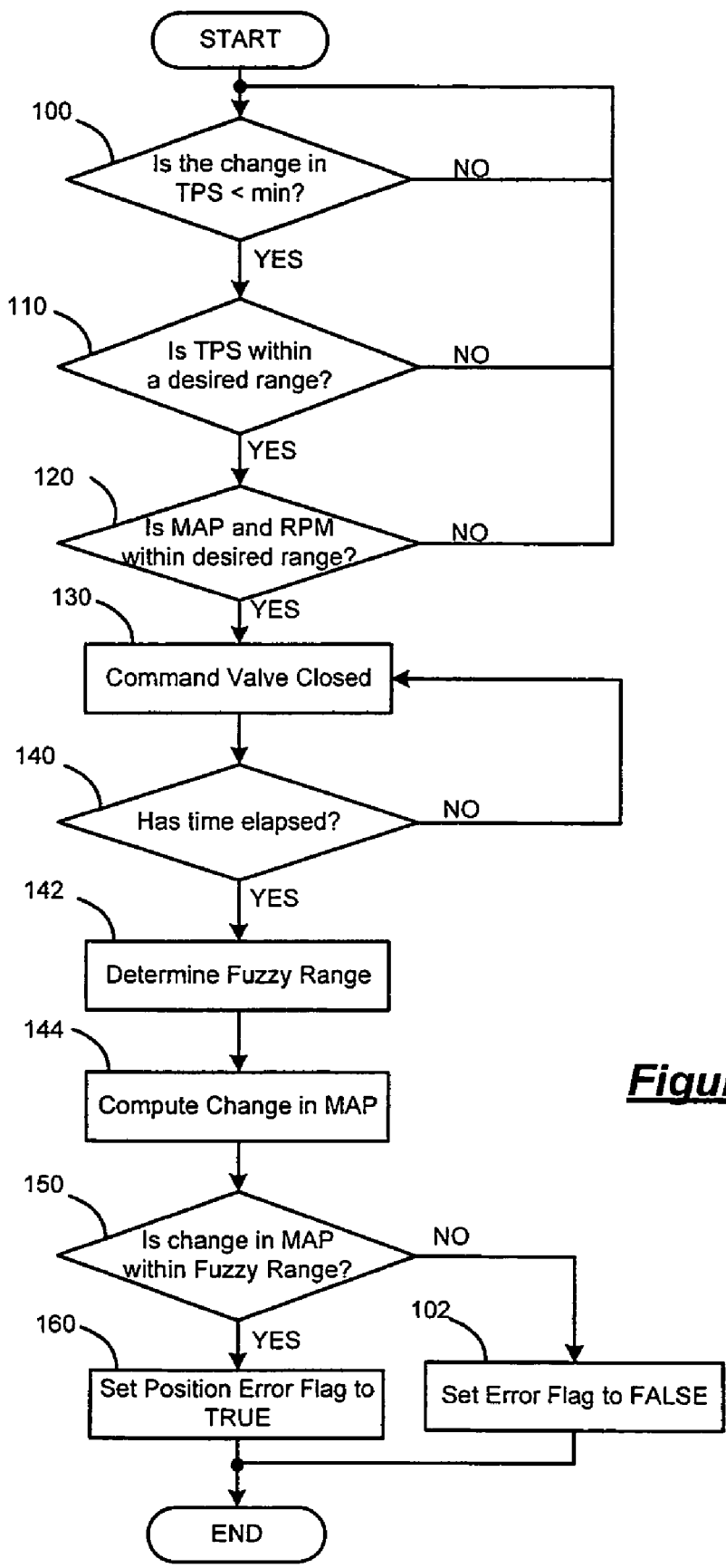
FIG. 4 is a flowchart illustrating a CMCV malfunction detection method.

Referring now to FIG. 4, a flowchart illustrates an exemplary control method for diagnosing a malfunction by commanding the CMCV to close and based on an expected change in MAP. As can be appreciated the CMCV control method of the present disclosure may be implemented in various forms. In an exemplary embodiment, the control method of FIG. 4 is continually run every one second throughout a key cycle of the vehicle. An error flag is initialized at power-up to FALSE.

In FIG. 4, the throttle position is evaluated at 100 and 110 to determine if a steady state condition exists. If a change in throttle position is less than a minimum value and if the throttle position is within a desired range, a steady state condition exists and control proceeds to evaluate MAP and RPM at 120. If the MAP is within a desired range and the RPM is within a desired range at 120, control commands the CMCV closed at 130. Otherwise, if steady state conditions are not met or MAP and RPM are outside of the desired ranges respectively, control loops back and continues to monitor the throttle position for a steady state condition at 100.

If after commanding the CMCV to close at 130, a specified time has elapsed at 140, control proceeds to evaluate a change in MAP. Otherwise control waits at 130 until the specified time has elapsed. Control determines a MAP range based on fuzzy logic at 142. Control computes a change in MAP at 144. If the change in MAP is within the fuzzy range at 150, a malfunction is detected and control sets the position error flag to TRUE at 160. Otherwise, control sets the position error flag to FALSE at 102. Once the malfunction has been detected and the position error flag is set to TRUE, the position error flag may be latched to TRUE until a reset flag is received.

As can be appreciated, all comparisons made in various embodiments of FIG. 4 can be implemented in various other forms depending on the selected values for the thresholds, times, and ranges. For example, a comparison of "less than" may be equivalently implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of diagnosing a malfunction of a charge motion control valve coupled to an intake manifold of an internal combustion engine, comprising:
   commanding the valve to at least one of close and open;
   determining a pressure range using fuzzy logic based on a mass of air flowing into the intake manifold and a temperature of the air flowing into the intake manifold;
   determining a change in absolute pressure within the intake manifold;
   comparing the change in absolute pressure to the pressure range; and
   diagnosing a malfunction of the valve when the change in absolute pressure is within the pressure range.

2. The method of claim 1 further comprising determining a steady state operating condition of the vehicle wherein the valve is commanded to at least one of close and open when the steady state operating condition is determined.

3. The method of claim 2 wherein the determining a steady state operating condition comprises:
   comparing a throttle position to a throttle range;
   computing a change in the throttle position;
   comparing the change in throttle position to a predetermined threshold; and
   wherein if the position is within the throttle range and the change in throttle position is less than the predetermined threshold, a steady state condition is determined.

4. The method of claim 1 further comprising;
   determining an absolute pressure of the intake manifold to be within a predetermined second pressure range; and
   determining a speed of the engine to be within a predetermined engine speed range.

5. The method of claim 1 wherein the determining a range, the determining a change in absolute pressure, and the comparing the change in absolute pressure to the pressure range is performed after a predetermined time period has elapsed after commanding the valve to at least one of close and open.

6. The method of claim 1 further comprising:
   setting a malfunction code when the malfunction is diagnosed; and
   latching the code to a true value until a reset command is received.

7. The method of claim 1 further comprising:
   repeating the method of claim 1 a selectable number of times;
   incrementing a fail counter each time a malfunction is diagnosed within the selectable number of times; and
   setting a malfunction code when the fail counter exceeds a threshold.

8. The method of claim 6 further comprising:
   repeating the method of claim 1 a selectable number of times;
   incrementing a pass counter each time a malfunction is not diagnosed within the selectable number of times; and
   resetting the malfunction code when the pass counter exceeds a threshold.

9. A control system for determining a malfunction of a charge motion control valve coupled to an intake manifold of an engine, comprising:
   a first input device that receives a manifold absolute pressure (MAP) signal indicating an absolute pressure of air in the intake manifold;
   a second input device that receives a mass airflow (MAF) signal indicating a mass of air flowing into the intake manifold;
   a third input device that receives an intake air temperature (IAT) signal indicating a temperature of the air entering the intake manifold; and
   a control module that determines a malfunction of a charge motion control valve by commanding the control valve from at least one of closed to open and opened to close and evaluating the MAP signal after the control valve is commanded to the at least one of open and close, wherein the control module evaluates the MAP signal by computing a change in MAP, determining a range using fuzzy logic based on the MAF signal and the IAT signal, and comparing the change in MAP to the determined range.

10. The control system of claim 9 wherein the control module determines a malfunction of the charge motion control valve when the change in MAP is within the determined range.

11. The control system of claim 9 wherein the control module sets a malfunction code when the malfunction is determined and does not reset the malfunction code until a reset command is received.

12. The control system of claim 11 wherein the reset command can be received based on at least one of a code clear event and an engine shutdown event.

13. The control system of claim 9 wherein the control module sets a malfunction code if a malfunction of the control valve is determined a selectable number of consecutive times.

14. The control system of claim 9 wherein the control module sets a malfunction code if a malfunction occurs a selectable number of times within a predetermined time period.

15. The control system of claim 9 further comprising:
a fourth input device that receives a throttle position (TPS) signal indicating a position of a throttle coupled to the engine; and
wherein the control module determines a steady state condition based on the TPS signal and determines a malfunction of the charge motion control valve if a steady state condition is determined and when the change in MAP is within the determined range.

16. The control system of claim 15 wherein the control module determines the steady state condition if the throttle signal indicates a throttle position within a predetermined throttle range and a change in throttle position less than a minimum threshold.

17. The control system of claim 9 wherein the control module evaluates the MAP signal by comparing the MAP signal to a predetermined MAP range, if the MAP signal is within the MAP range, the change in MAP is computed and evaluated.

18. The control system of claim 17 further comprising:
a fifth input device that receives an engine speed signal indicating a rotational speed of the engine; and
wherein the control module compares the engine speed signal to a predetermined engine speed range and if the engine speed signal is within the engines speed range, the change in MAP is computed and evaluated.

* * * * *